United States Patent [19]

Takahashi et al.

[11] Patent Number: 4,802,202
[45] Date of Patent: Jan. 31, 1989

[54] TELEPHONE CALL SELECTOR

[75] Inventors: Ryoichi Takahashi, Gunma; Seiichi Ogawa, Ohta; Isao Ohtawara, Gunma, all of Japan

[73] Assignee: Sanyo Electric Co., Ltd., Japan

[21] Appl. No.: 92,936

[22] Filed: Sep. 3, 1987

[30] Foreign Application Priority Data

| Sep. 10, 1986 | [JP] | Japan | 61-213380 |
| Sep. 19, 1986 | [JP] | Japan | 61-222631 |
| Sep. 25, 1986 | [JP] | Japan | 61-227775 |
| Oct. 15, 1986 | [JP] | Japan | 61-244373 |
| Oct. 27, 1986 | [JP] | Japan | 61-255233 |

[51] Int. Cl.$^4$ .................. H04M 1/57; H04M 1/64; H04M 1/66
[52] U.S. Cl. ................................ 379/67; 379/199; 379/373; 379/374
[58] Field of Search ............... 379/67, 373, 199, 88, 379/374

[56] References Cited

U.S. PATENT DOCUMENTS

| 3,644,675 | 2/1972 | Watlington | 379/92 |
| 3,925,622 | 12/1975 | Robinson | 379/40 |
| 4,006,316 | 2/1977 | Bolgiano | 379/104 |
| 4,266,098 | 5/1981 | Novals | 379/77 |
| 4,387,272 | 6/1983 | Castro et al. | 379/77 |
| 4,446,334 | 5/1984 | Groff | 379/188 |

FOREIGN PATENT DOCUMENTS

| 3347331 | 7/1985 | Fed. Rep. of Germany | 379/199 |
| 3411206 | 10/1985 | Fed. Rep. of Germany | 379/199 |
| 0129469 | 10/1981 | Japan | 379/88 |
| 0208965 | 11/1984 | Japan | 379/199 |
| 0144055 | 7/1985 | Japan | 379/199 |

Primary Examiner—Thomas W. Brown
Attorney, Agent, or Firm—Darby & Darby

[57] ABSTRACT

A telephone call selector in a telephone which comprises a memory circuit for storing a plurality of telephone numbers; an automatic dialing device operable to read out one of the telephone numbers from the memory circuit and to output a dialed signal representative of such one of the telephone numbers; a comparator for comparing a number, corresponding to a DTMF signal transmitted from a calling party subsequent to the receipt of a ringing signal generated from a local telephone of the calling party, with any one of identifier codes; and a loudspeaker device for emitting ringing sounds when the the number corresponding to the DTMF signal coincides with such one of the identifier codes. The telephone numbers stored in the memory circuit are utilized as the respective identifier codes.

5 Claims, 4 Drawing Sheets

TELEPHONE CALL SELECTOR

BACKGROUND OF THE INVENTION 1. (Field of the Invention)

The present invention generally relates to a telephone system and, more particularly, to a telephone call selector for protecting a telephone subscriber from prank calls and wrong numbers.

2. (Description of the Prior Art)

As a matter of practice, a telephone subscriber can recognize that a telephone call is made to him or her, when he or she listens to a ringing sound generated from his or her telephone as a result of the arrival of a ringing signal from the calling party's telephone through a telephone line. Once the telephone rings, the receiving party is generally forced to answer the telephone and this is true even where a prank call or a wrong number has been made. Prank calls and wrong numbers are not really welcome and the receiving party is unable to ascertain whether or not it is a prank call or a wrong number before the telephone handset is unhooked.

In order to substantially avoid the prank calls and the wrong numbers, a telephone system has been suggested in, for example, the Japanese Laid-open Patent Publication No. 55-11668, published in 1980, wherein a telephone can ring only when dialed by those who are informed of an identifier code unique to such telephone. The identifier code can be arbitrarily chosen by the owner of a telephone when it is to be latched in his or her telephone.

According to this prior art telephone system, the owner of a particular telephone in which the identifier code has been latched must disclose his or her identifier code to those who are acquainted, familiar and/or associated in any manner with him or her. This is possible so long as the owner remembers his or her identifier code, and once he or she forgets it, a problem would arise.

Apart from the problems associated with the prank calls and the wrong numbers, the sequential dialing of the station number and the subscriber's number often irritates the calling party who is then dialing because of a substantial time required to have his or her telephone connected with the receiving party. In view of this, a telephone having an automatic dialing device built therein is currently widely used in practice such as disclosed in, for example, the Japanese Patent Publication No. 53-30601 published in 1978. According to this publication, the automatic dialing device includes a memory means for storing at respective address locations a plurality of telephone numbers of those who are acquainted, familiar and/or associated in any manner with the calling party, so that, either by pushing one of push buttons associated with the respective address locations or by dialing one of address numbers allocated to the respective address locations, each of which address numbers consisting of a smaller number of digits, for example, two or three digits, than the number of digits comprising a telephone number, the telephone of the calling party can be connected with that of the receiving party.

SUMMARY OF THE INVENTION

The present invention has been devised with a view toward substantially eliminating the problems inherent in the prior art telephone system and has for its essential object the provision of a circuit for selecting a calling party for the purpose of rejecting the prank calls and the wrong numbers before the telephone handset is unhooked.

According to one preferred embodiment of the present invention, the telephone call selector is featured in that a ringing sound can be generated only when a DTMF signal, transmitted from the calling party subsequent to the terminating connection, and one of the telephone numbers stored in the memory means coincide with each other. For this purpose, the present invention makes use of the telephone numbers, stored in the memory circuit, as respective identifier codes for use in selecting the calling parties.

According to another preferred embodiment of the present invention, the telephone call selector is featured in that not only can the ringing sound be generated only when the DTMF signal and the telephone number stored in the memory means coincide with each other, but also the ringing sound can be answered back to the calling party.

According to a further preferred embodiment of the present invention, the telephone call selector is featured in that not only can the ringing sound be generated only when the DTMF signal and the telephone number stored in the memory means coincide with each other, but also an answering message can be sent back to the calling party subsequent to the comparison of a number, corresponding to the DTMF signal, with the identifier code.

According to a still further preferred embodiment of the present invention, not only are the telephone numbers which are stored in the memory means in the automatic dialing device, used as respective identifier codes unique to the respective parties, but also a telephone number usable as a respective identifier code can be designated.

A still further preferred embodiment of the present invention is featured in that not only can the ringing sound be generated only when the DTMF signal and the telephone number stored in the memory circuit coincide with each other, but also arrangement has been made to permit the telephone call selector to be selectively brought into operative and inoperative conditions by the action of a timer circuit.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE EMBODIMENTS

Figure 1:
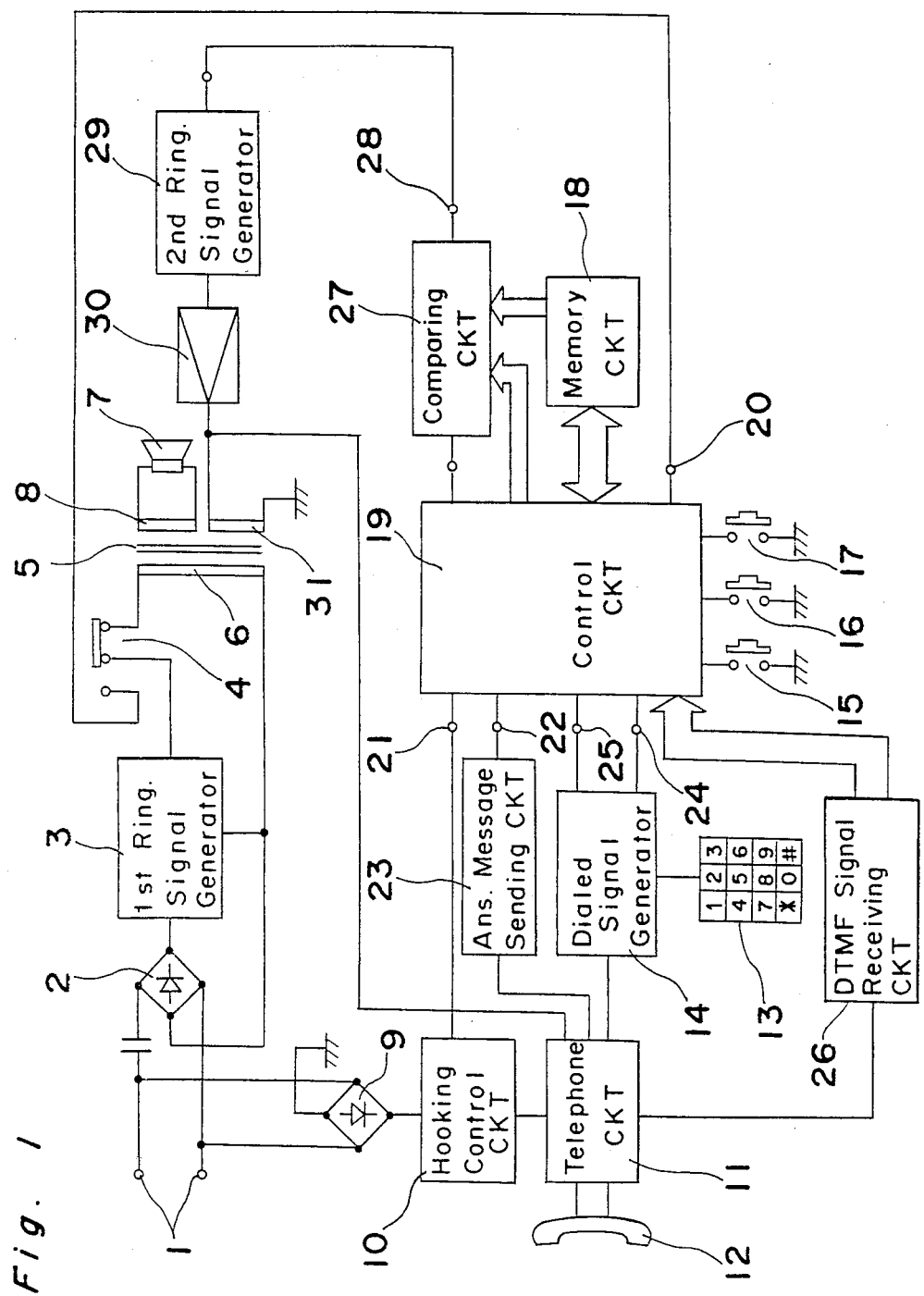
FIGS. 1 to 4 are block circuit diagrams showing a telephone call selector according to respective preferred embodiments of the present invention.

Before the description of the present invention proceeds, it is to be noted that like parts are designated by like reference numerals throughout the accompanying drawings.

Referring first to FIG. 1 illustrating the telephone call selector according to a first preferred embodiment of the present invention, reference numeral 1 represents terminals adapted to be connected with a telephone line. The telephone call selector includes a first diode bridge circuit 2 for rectifying a ringing signal transmitted thereto through the terminals 1 via the telephone line, a first ringing signal generator 3 for generating a ringing signal in response to the application of the rectified ringing signal thereto from the first diode bridge circuit 2, and a selector switch 4 for selectively bringing the selection of a calling party into operative and inoperative conditions, which switch 4 is shown in FIG. 1 as held at an inoperative position.

The telephone call selector also includes a transformer 5 having primary, secondary and third windings 6, 8 and 31, said primary winding 6 being applied the ringing signal from the first ringing signal generator 3 when and so long as the selector switch 4 is held at the inoperative position; a loudspeaker 7 connected with the secondary winding 8 of the transformer 5 as a load for generating sounds in response to the ringing signal; a second diode bridge circuit 9 used to determine the polarity of connection with the telephone line; a hooking control circuit 10 for controlling the connection with the telephone line; and a telephone circuit 11 which is generally referred to as a speech network and which is connected with a telephone handset 12.

The telephone call selector further includes a dialing keyboard 13 having a plurality of dialing push buttons adapted to be operated when dialing; a dialed signal generator 14 for generating a dialed signal corresponding to a number associated with each of numbers allocated to the respective dialing push buttons in the dialing keyboard 13; first, second and third operating switches 15, 16 and 17 adapted to be operated during the automatic dialing operation; a memory circuit 18 for storing a plurality of telephone numbers used during the automatic dialing operation; and a control circuit 19 for controlling the storage of the telephone numbers in the memory circuit 18 and the read-out of the telephone numbers from the memory circuit 18 in correspondence with the operating switches 15 to 17.

The control circuit 19 has a control terminal 20 to which the ringing signal generated from the first ringing signal generator 3 is applied, when the selector switch 4 is in the operative position, to permit the control circuit 19 to effect various operations, a hooking control signal output terminal 21 from which a signal used to control the hooking control circuit 10 emerges and from which, when the signal is applied to the control terminal 20, a signal necessary to connect the telephone line is generated, and a drive signal output terminal 22 from which a drive signal is outputted after the telephone line has been connected as a result of the operation of the hooking control circuit 10 effected in response to the signal outputted to the terminal 21 of the control circuit 19. The terminal 22 is connected with an answering message sending circuit 23 which can be brought into operation in response to the drive signal applied thereto through the terminal 22 from the control circuit 19 for transmitting to the calling party a message inviting the calling party to transmit an identifier code.

The control circuit 19 also has an input terminal 24 to which a signal corresponding to the number inputted by manipulating some of the push buttons in the dialing keyboard 13 is applied during an operation in which the telephone number is stored in the memory circuit 18; and an output terminal 25 connected with the dialed signal generator 14 and from which the telephone number read out from the memory circuit 18 during the automatic dialing operation is outputted to the dialed signal generator 14.

Reference numeral 26 represents a DTMF signal receiver circuit for receiving a DTMF signal, that is, a signal indicative of an identifier code, transmitted from the calling party, which receiver circuit 26 is so designed as to output a coded signal to the control circuit 19 and also as to store such coded signal in an incoming number storage circuit (not shown) built in the control circuit 19.

Reference numeral 27 represents a comparing circuit adapted to be operated subsequent to the connecting operation performed by the hooking control circuit 10 to compare one of the telephone numbers stored in the memory circuit 18 with the number stored in the incoming number storage circuit, said comparing circuit 27 having an output terminal 28 from which a high level signal is generated when the result of comparison indicates that the telephone number stored in the memory circuit 18 coincides with the number stored in the incoming number storage circuit. While the memory circuit 18 stores subscribers' numbers, station numbers and toll numbers, the comparing operation performed by the comparing circuit 27 is carried out subject to the subscriber's number, that is, the last four digits of the telephone number required to be dialed.

Reference numeral 29 represents a second ringing signal generator adapted to be brought into operation when the high level signal is generated from the output terminal 28 of the comparing circuit 27 and to generate a ringing signal different from the ringing signal generated from the first ringing signal generator 3. Reference numeral 30 represents an amplifier for amplifying the ringing signal outputted from the second ringing signal generator 29, an amplified ringing signal from the amplifier 30 being applied to the third winding 31 of the transformer 5 and also to the telephone circuit 11.

It is to be noted that, in the event that result of the comparison performed by the comparing circuit 27 indicates that the incoming number transmitted from the calling party does not coincide with the telephone number stored in the memory circuit 18, the hooking control circuit 10 can be restored after a predetermined time to disconnect the telephone from the telephone line. It is also to be noted that arrangement has been made that, when the handset 12 is hooked off while the ringing sound generated from the second ringing signal generator 29 is emitted from the loudspeaker 7, the second ringing signal generator 29 can be brought into an inoperative condition.

While the telephone call selector according to the first preferred embodiment of the present invention is constructed as hereinabove described, it operates in the following manner. The storing operation in which telephone numbers are stored in the memory circuit 18 will first be described.

This storing operation is carried out by manipulating the first, second and third operating switches 15 to 17, while a storing switch (not shown) capable of being switched over only during the storing operation is switched over to a mode representative of the storing operation, and, at the same time, by operating the push buttons in the push button dialing keyboard 13 according to a particular telephone number. The answering message sending circuit 23 has a message storage circuit incorporated therein for storing an answering message and, accordingly, during the storing operation, the answering message can be stored in the answering message storage circuit in a tone of voice of the owner of the telephone. An example of the answering message may be "Yes, this is XXXXX speaking. Please give me your telephone number."

While the storage of the telephone number in the memory circuit 18 and the storage of the answering message are carried out in the above described manner, the operation as a telephone device will now be described. When the telephone subscriber wishes to call a person whose telephone number is not stored in the memory circuit 18, the call can be made by manipulating some of the push buttons in the push button dialing keyboard 13 after the telephone handset 12 has been hooked off. Specifically, when the telephone handset 12 is hooked off, a hook switch (not shown) is switched over in manner well known to those skilled in the art to connect the subscriber's telephone with the telephone line. When some of the push buttons in the push button dialing keyboard 13 are manipulated during this condition, a dialed signal corresponding to the manipulated push buttons in the dialing keyboard 13 is generated from the dialed signal generator 14 and is then transmitted to the telephone line through the telephone circuit 11.

However, when the call is desired to be made based on the automatic dialing scheme, the following operation takes place. More specifically, the automatic dialing can be carried out by manipulating the operating switches 15 to 17, provided for the memory in which telephone numbers desired to be called are stored, while the telephone handset 12 is hooked off. By way of example, when the first operating switch 15 is depressed to close, one of the telephone numbers stored in the memory circuit 18, which is stored in a memory corresponding to the first operating switch 15, is read out and applied to the dialed signal generator 14. As a result thereof, the dialed signal representative of such one of the telephone numbers is outputted from the dialed signal generator 14 and is then transmitted to the telephone line through the telephone circuit 11, thereby permitting the telephone subscribed to carry out a telephone communication with the receiving party.

On the other hand, when it comes to the receipt of a telephone call from the remote calling party, the following operation takes place. Assuming that the selector switch 4 for bringing the selection of the calling party selectively into operative and inoperative conditions is held in the inoperative position as shown, the telephone device embodying the present invention can be used as a usual telephone device. More specifically, with the selector switch 4 so conditioned as shown in FIG. 1, and when the ringing signal is transmitted through the telephone line, the ringing signal is applied to the first ringing signal generator 3 through the first diode bridge circuit 2. As a result thereof, the first ringing signal generator 3 is brought into operation with its output terminal outputting a ringing signal which is an electronic sound. The ringing signal generated from the first ringing signal generator 3 is applied to the primary winding 6 of the transformer 5 through the selector switch 4 so that the ringing signal can be induced in the secondary winding 8 of the same transformer 5 with the result that the ringing sound can be generated from the loudspeaker 7 to inform the owner of the telephone of the arrival of the incoming telephone call from the remote calling party. When the owner of the telephone having listened to the ringing sound so generated from the loudspeaker 7 hooks off the handset 12, the telephone can be connected with the telephone line and can therefore start a telephone communication with the calling party.

However, when and so long as the selector switch 4 is set in the operative position opposite to the illustrated inoperative position, the following operation takes place. When the ringing signal is transmitted through the telephone line while the selector switch 4 is set in the operative position, the ringing signal is outputted from the first ringing signal generator 3 in a similar manner as hereinbefore described. However, with the selector switch 4 set in the operative position, a signal transmitting circuit between the first ringing signal generator 3 and the primary winding 6 of the transformer 5 is disconnected and, therefore, no ringing sound is emitted from the loudspeaker 7. Instead, the ringing signal outputted from the first ringing signal generator 3 is applied to the control terminal 20 of the control circuit 19 through the selector switch 4, thereby initiating the control operation of the control circuit 19. Specifically, when the ringing signal is applied to the control terminal 20 of the control circuit 19, a signal necessary to effect a connecting operation is applied to the hooking control signal output terminal 21 of the control circuit 19, causing the hooking control circuit 10 to perform the telephone line connecting operation. Subsequent to the connecting operation, the drive signal is outputted to the drive signal output terminal 22 of the control circuit 19, which is in turn applied to the answering message sending circuit 23.

The answering message sending circuit 23 is brought into operation in response to the drive signal so applied thereto, with the consequence that the message stored in the message storage circuit, that is, the message reading "Yes, this is XXXXX speaking. Please give me your telephone number." for inviting the transmission of an identifier code, is outputted and is then transmitted to the calling party through the telephone circuit 11.

When the calling party listening to the message so transmitted from the receiving party manipulates a dial button capable of responding to the telephone number, a signal corresponding to each button, that is, the DTMF signal, is transmitted to the telephone line. The DTMF signal transmitted from the calling party is applied to the DTMF signal receiving circuit 26 through the second diode bridge circuit 9, then the hooking control circuit 10 and finally the telephone circuit 11. In response to the DTMF signal, the DTMF signal receiving circuit 26 generates to the control circuit 19 a signal which is a coded version of the telephone number of the calling party. The coded signal so inputted to the control circuit 19 is stored in the incoming number storage circuit built in the control circuit 19. Then, the comparison between the number stored the incoming number storage circuit and the telephone number stored in the memory circuit 18 is carried out by the comparing circuit 27. In the event that the number stored in the incoming number storage circuit coincides with the telephone number stored in the memory circuit 18, the high level signal emerges from the output terminal 28 of the comparing circuit 27 and is in turn applied to the second ringing signal generator 29. The second ringing signal generator 29 is brought into operation in response to the high level signal with the consequence that the ringing signal different from the ringing sound generated by the first ringing signal generator 3 is outputted from the second ringing signal generator 29.

The ringing signal generated from the second ringing signal generator 29 is, after having been amplified by the amplifier 30, applied to the third winding 31 of the transformer 5. As a result thereof, the ringing signal is induced in the secondary winding 8 of the transformer 5 and subsequently applied to the loudspeaker 7 to permit the latter to emit a ringing sound. During a period in which this ringing operation is performed, the ringing signal generated from the second ringing signal generator 29 is transmitted to the calling party through the telephone circuit 11 and, therefore, the calling party can recognize that the ringing operation is being carried out at the end of the receiving party. On the other hand, when the owner of the telephone having listened to the ringing sound emitted from the loudspeaker 7 hooks off the handset 12, both of the comparing circuit 27 and the second ringing signal generator 29 are brought into inoperative conditions and the owner of the telephone can communicate with the calling party via the telephone line.

Thus, it will readily be seen that, only when the number transmitted from the calling party coincides with the telephone number stored in the memory circuit 18, the ringing is carried out by the second ringing signal generator 29. However, should the number transmitted from the calling party fail to coincide with the telephone number stored in the memory circuit 18, no high level signal emarges from the output terminal 28 of the comparing circuit 27 and, therefore, the second ringing signal generator 29 will not be brought into operation. On the other hand, after the passage of the predetermined time, a signal necessary to disconnect the telephone line is outputted to the hooking control signal output terminal 21 of the control circuit 19 to cause the hooking control circuit 10 to perform a disconnecting operation. In this way, in the event a telephone call is made from a person whose telephone number does not coincide with any one of the telephone numbers stored in the memory circuit 18, no ringing sound is generated from the loudspeaker 7 and, therefore, any possible prank call or wrong number can be rejected.

It is to be noted that, in the foregoing embodiment, the number of the telephone numbers stored for the purpose of the automatic dialing function has been shown to be three, but the number thereof is not always limited thereto. In addition, in describing the foregoing embodiment of the present invention, the comparison has been described as made with the telephone numbers stored in the memory circuit provided for the purpose of the dialing operation performed by manipulating single buttons. However, in a telephone device wherein any one of the telephone numbers stored in the memory circuit can be read out by a special manipulation of the dialing keyboard 13, that is, an abbreviated dialing capability, the comparison may be made with the telephone numbers stored in such memory circuit.

Also, instead of the use of the memory circuit in the answering message sending circuit 23 for the storage of the answering message, the answering message sending circuit 23 may be constituted by a cassette tape recorder with a message-recorded cassette tape incorporated therein.

As hereinbefore described, since the telephone call selector according to the present invention is so designed that the ringing sounds can be emitted only when the number corresponding to the DTMF signal transmitted from the calling party coincides with the telephone number stored in the memory circuit 18, the owner of the telephone can be protected from the prank calls and the wrong numbers. In addition, since the telephone numbers stored in the memory circuit 18 for the purpose of the automatic dialing function are utilized as respective identifier codes for the purpose of the selection of the calling party, the owner of the telephone need not inform the identifier code to those concerned and, therefore, there is no possibility that he or she may forget the identifier code.

Moreover, according to the present invention, since the ringing sounds are transmitted back to the calling party when the telephone has rung subsequent to the calling party when the telephone has rung subsequent to the coincidence of the number, transmitted from the calling party subsequent to the receipt of the telephone call by the receiving party, with the telephone number stored in the memory circuit 18, the receiving party can readily recognize that his or her telephone call has been properly transmitted to the intended party, without being annoyed.

A second preferred embodiment of the present invention will now be described with particular reference to FIG. 2. In this embodiment of FIG. 2, the comparing circuit 27 has, in addition to the output terminal 28, a second output terminal 35 from which, when the number transmitted from the calling party fails to coincide with any one of the telephone numbers stored in the memory circuit 18, a high level signal is outputted.

Figure 2:
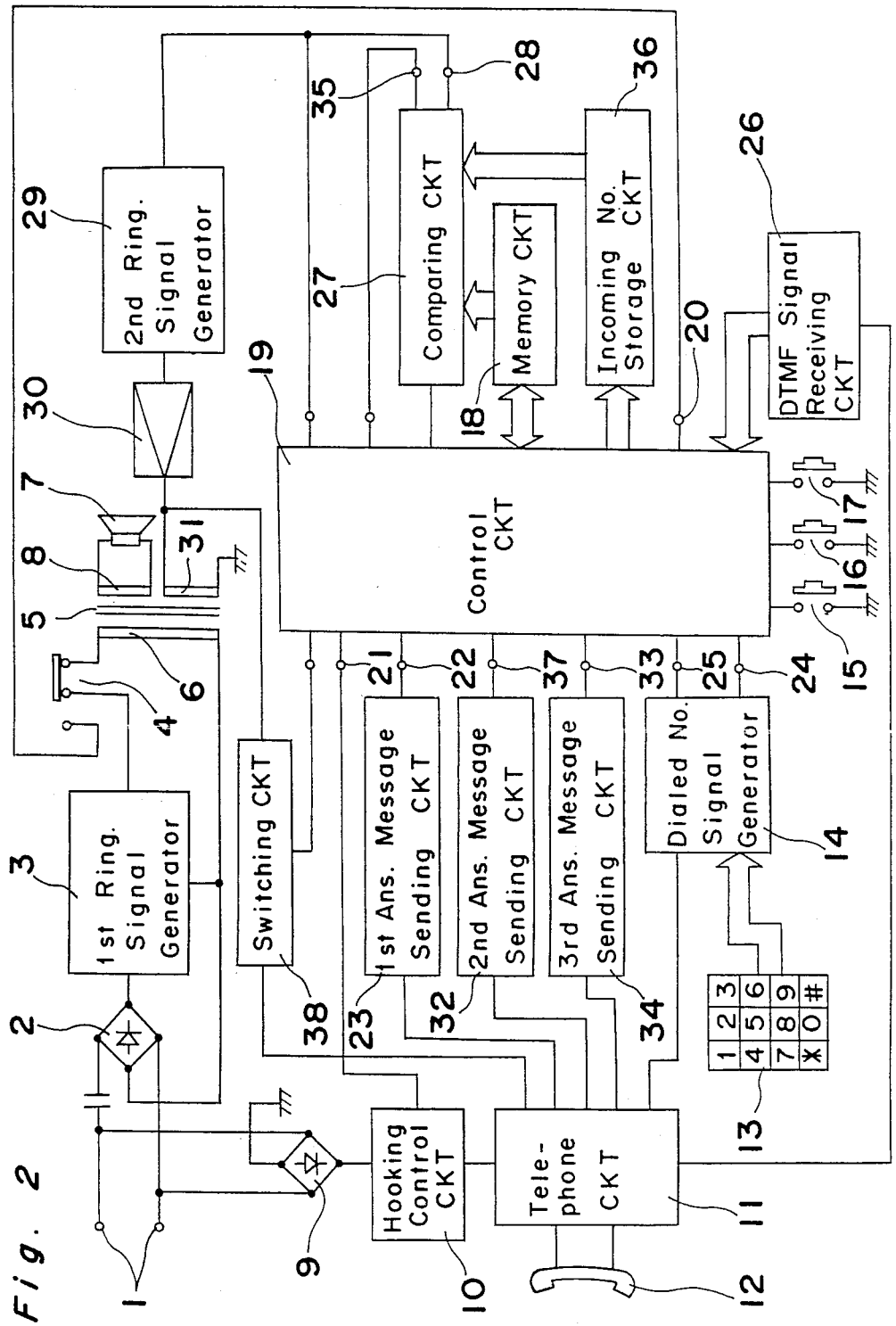

Also, the telephone call selector according to the second preferred embodiment shown in FIG. 2 further comprises an incoming number storage circuit 36 for storing a number received by the DTMF signal receiving circuit 26; a second drive signal output terminal 37 from which a drive signal emerges when the high level signal is outputted from the first output terminal 28; a second answering message sending circuit 32 adapted to be operated, when the drive signal is outputted to the second drive signal output terminal 37, to transmit a message requesting the calling party to wait for a moment, which message is transmitted during a period in which the identifier code is compared; a third drive signal output terminal 33 from which a signal is outputted when the high level signal is outputted from the second output terminal 35 of the number comparing circuit 27; and a third answering message sending circuit 34 adapted to be operated, when the drive signal is outputted from the third drive signal output terminal 33, to transmit a message indicating that the number transmitted from the calling party does not coincide with the telephone number stored in the memory circuit 18.

The system also comprises a switching circuit 38 so connected as to supply the ringing signal from the second ringing signal generator 29, which has been amplified by the amplifier 30, to the telephone circuit 11 after the message has been transmitted to the calling party from the second answering message sending circuit 32.

In this circuit construction, when the telephone handset 12 hooked off while the ringing operation is being carried out based on the ringing signal supplied from the second ringing signal generator 29, that is, while the ringing operation is being carried out as a result of the coincidence of the telephone numbers confirmed by the comparing circuit 27, the second ringing signal generator 29 can be brought into inoperative condition. Also, should the number transmitted from the calling party does not coincide with the telephone number stored in the memory circuit 18, the hooking control circuit 10 is operated to disconnect the telephone line after the message has been transmitted to the calling party from the third answering message sending circuit 34. In the event that the calling party once having dialed to a local subscriber disconnect the telephone line after the ringing signal from the calling party has arrived at the local subscriber's telephone, for example, while the ringing operation is being carried out by the second ringing signal generator 29 at the end of the receiving party, a detector circuit (not shown) for detecting change in signal on the telephone line can cause the control circuit 19 to disconnect the telephone line and also the other circuit components to restore to initial states.

While the telephone call selector according to the second preferred embodiment of the present invention is so constructed as hereinbefore described, it operates in a manner similar to that according to the first preferred embodiment of the present invention. Specifically, the storage of the telephone numbers in the memory circuit 18 is carried out by manipulating the first, second and third operating switches 15 to 17, while the storing switch (not shown) capable of being switched over only during the storing operation is switched over to a mode representative of the storing operation, and, at the same time by operating the push buttons in the push button dialing keyboard 13 according to a particular telephone number. Each of the first to third answering message sending circuit 23, 32 and 34 has a respective message storage circuit incorporated therein for storing the respective answering message in a tone of the owner of the telephone. An example of the answering message stored in the first answering message sending circuit 23 may be "Yes, this is XXXXX speaking. Please give me your telephone number." An example of the answering message stored in the second answering message sending circuit 32 may be "Just a moment. Your destination is now ringing." Similarly, an example of the message stored in the third answering message sending circuit 34 may be "Your party does not answer. Please call back later."

According to the second preferred embodiment of the present invention, the operation as a usual telephone device is substantially identical with that according to the foregoing embodiment and is not, therefore, reiterated for the sake of brevity. However, when an so long as the selector switch 4 is set in the operative position opposite to the illustrated inoperative position, the following operation takes place.

When the ringing signal is transmitted through the telephone line while the selector switch 4 is set in the operative position, the ringing signal is outputted from the first ringing signal generator 3 in a similar manner as hereinbefore described. However, with the selector switch 4 set in the operative position, a signal transmitting circuit between the first ringing signal generator 3 and the primary winding 6 of the transformer 5 is disconnected and, therefore, no ringing sound is emitted from the loudspeaker 7. Instead, the ringing signal outputted from the first ringing signal generator 3 is applied to the control terminal 20 of the control circuit 19 through the selector switch 4, thereby initiating the control operation of the control circuit 19. Specifically, when the ringing signal is applied to the control terminal 20 of the control circuit 19, a signal necessary to effect a connecting operation is applied to the hooking control signal output terminal 21 of the control circuit 19, causing the hooking control circuit 10 to perform the telephone line connecting operation. Subsequent to the connecting operation, the drive signal is outputted to the drive signal output terminal 22 of the control circuit 19, which is in turn applied to the answering message sending circuit 23. The answering message sending circuit 23 in response to the drive signal so applied thereto is brought into operation in response to the drive signal so applied thereto, with the consequence that the message stored in the message storage circuit, that is, the message reading "Yes, this is XXXXX speaking. Please give me your telephone number." for inviting the transmission of an identifier code, is outputted and is then transmitted to the calling party through the telephone circuit 11.

When the calling party listening to the message so transmitted from the receiving party manipulates a dial button capable of responding to the telephone number, a signal corresponding to each button, that is, the DTMF signal, is transmitted to the telephone line. The DTMF signal transmitted from the calling party is applied to the DTMF signal receiving circuit 26 through the second diode bridge circuit 9, then the hooking control circuit 10 and finally the telephone circuit 11. In response to the DTMF signal, the DTMF signal receiving circuit 26 generates to the control circuit 19 a signal which is coded version of the telephone number of the calling party. The coded signal so inputted to the control circuit 19 is stored in the incoming number storage circuit 36 built in the control circuit 19. Then, the comparison between the number stored the incoming number storage circuit 36 and the telephone number stored in the memory circuit 18 is carried out by the comparing circuit 27. In the event that the number stored in the incoming number storage circuit 36 coincides with the telephone number stored in the memory circuit 18, the high level signal emerges from the output terminal 28 of the comparing circuit 27 and is in turn applied to the second ringing signal generator 29. The second ringing signal generator 29 is brought into operation in response to the high level signal with the consequence that the ringing signal different from the ringing sound generated by the first ringing signal generator 3 is outputted from the second ringing signal generator 29 and, at the same time the drive signal is outputted from the second drive signal output terminal 37 of the control circuit 19 to the second answering message sending circuit 32. The ringing signal generated from the second ringing signal generator 29 is, after having been amplified by the amplifier 30, applied to the third winding 31 of the transformer 5. As a result thereof, the ringing signal is induced in the secondary winding 8 of the transformer 5 and subsequently applied to the loudspeaker 7 to permit the latter to emit a ringing sound.

On the other hand, when the drive signal is supplied to the second answering message sending circuit 32, the latter is brought into operation with the consequence that the message reading "Just a moment. Your destination is now ringing." is transmitted to the calling party through the telephone circuit 11. This message is available only when the identifier number coincides with the telephone number stored in the memory circuit 18. It is to be noted that, during the transmission of the message stored in the second answering message sending circuit 32 to the calling party, the loudspeaker 7 also generates the ringing sound. However, the ringing applied to the loudspeaker 7 is not transmitted to the calling party because at the moment the transmission of the message to the telephone circuit 11 is inhibited by the switching circuit 38.

Accordingly, under these circumstances, the calling party can read only the message originating from the second answering message sending circuit 32 incorporated in the telephone of the receiving party.

After the termination of the transmission of the message originating from the second answering message sending circuit 32, the inhibiting action performed by the switching circuit 38 is released, permitting the ringing signal, amplified by the amplifier 30, to be transmitted to the calling party through the telephone circuit 11. The calling party can, after listening to the ringing signal so transmitted, recognize that the ringing operation is being carried out at the end of the receiving party and, on the other hand, the receiving party can, when listening to the ringing sounds generated from the loudspeaker 7 which are different in tone, recognize not only the arrival of the telephone call, but also the telephone call made by the party whose telephone number is stored in the memory circuit 18, that is, the party selected by the telephone call selector. When and after the owner of the telephone hooks off the telephone handset 12, both of the comparing circuit 27 and the second ringing signal generator 29 are brought into inoperative conditions and the owner of the telephone can communicate with the calling party via the telephone line.

Thus, when the number transmitted from the calling party coincides with the telephone number stored in the memory circuit 18, the high level signal is outputted from the first output terminal 28 of the comparing circuit 27 to effect the operation as hereinbefore described.

However, in the event that the number transmitted from the calling party fail to coincide with the telephone number stored in the memory circuit 18, no high level signal emerge from the first output terminal 28 of the comparing circuit 27 and, therefore, the second ringing signal generator 29 will not be brought into operation. In such case, the high level signal is outputted to the second output terminal 35 of the comparing circuit 27, and the drive signal is in turn outputted to the third drive signal output terminal 33 of the control circuit 19. In response to the drive signal, the third answering message sending circuit 34 is activated to transmit through the telephone circuit 11 to the calling party the message reading "Your party does not answer. Please call back later." which is stored in the message storage circuit of the third answering message sending circuit 34. This is an indication that the number transmitted from the calling party does not coincide with the identifier code. After the transmission of the message from the third answering message sending circuit 34, a signal necessary to disconnect the telephone line is outputted to the hooking control signal output terminal 21 of the control circuit 19 to cause the hooking control circuit 10 to perform a disconnecting operation. In this way, in the event a telephone call is made from a person whose telephone number does not coincide with any one of the telephone number stored in the memory circuit 18, no ringing sound is generated from the loudspeaker 7 and, therefore, any possible prank call or wrong number can be rejected.

It is to be noted that, in the foregoing embodiment, the number of the telephone numbers stored for the purpose of the automatic dialing function has been shown to be three, but the number thereof is not always limited thereto. In addition, in describing the foregoing embodiment of the present invention, the comparison has been described as made with the telephone numbers stored in the memory circuit 18 provided for the purpose of the dialing operation performed by manipulating single buttons. However, in a telephone device wherein any one of the telephone numbers stored in the memory circuit 18 can be read out by a special manipulation of the dialing keyboard 13, that is, an abbreviated dialing capability, the comparison may be made with the telephone numbers stored in such memory circuit.

While in the foregoing embodiment the use has been made of the telephone numbers stored in the memory circuit 18 for the purpose of the automatic dialing function as the identifier codes, an additional memory circuit separate from the memory circuit 18 may be used for storing the identifier codes.

Also, instead of the use of the memory circuit in each of the first to third answering message sending circuits 23, 32 and 34 for the storage of the respective answering message, a cassette tape recorder with a message-recorded cassette tape incorporated therein may be employed therefor.

As hereinbefore described, since the telephone call selector according to the second preferred embodiment of the present invention is so designed that the ringing sounds can be emitted only when the number corresponding to the DTMF signal transmitted from the calling party coincides with the telephone number stored in the memory circuit, the owner of the telephone can be protected from the prank calls and the wrong numbers. Moreover, since the ringing sounds are transmitted back to the calling party when the telephone has rung subsequent to the calling party when the telephone has rung subsequent to the coincidence of the number, transmitted from the calling party subsequent to the receipt of the telephone call by the receiving party, with the telephone number stored in the memory circuit 18, the receiving party can readily recognize that his or her telephone call has been properly transmitted to the intended party, without being annoyed.

Figure 3:
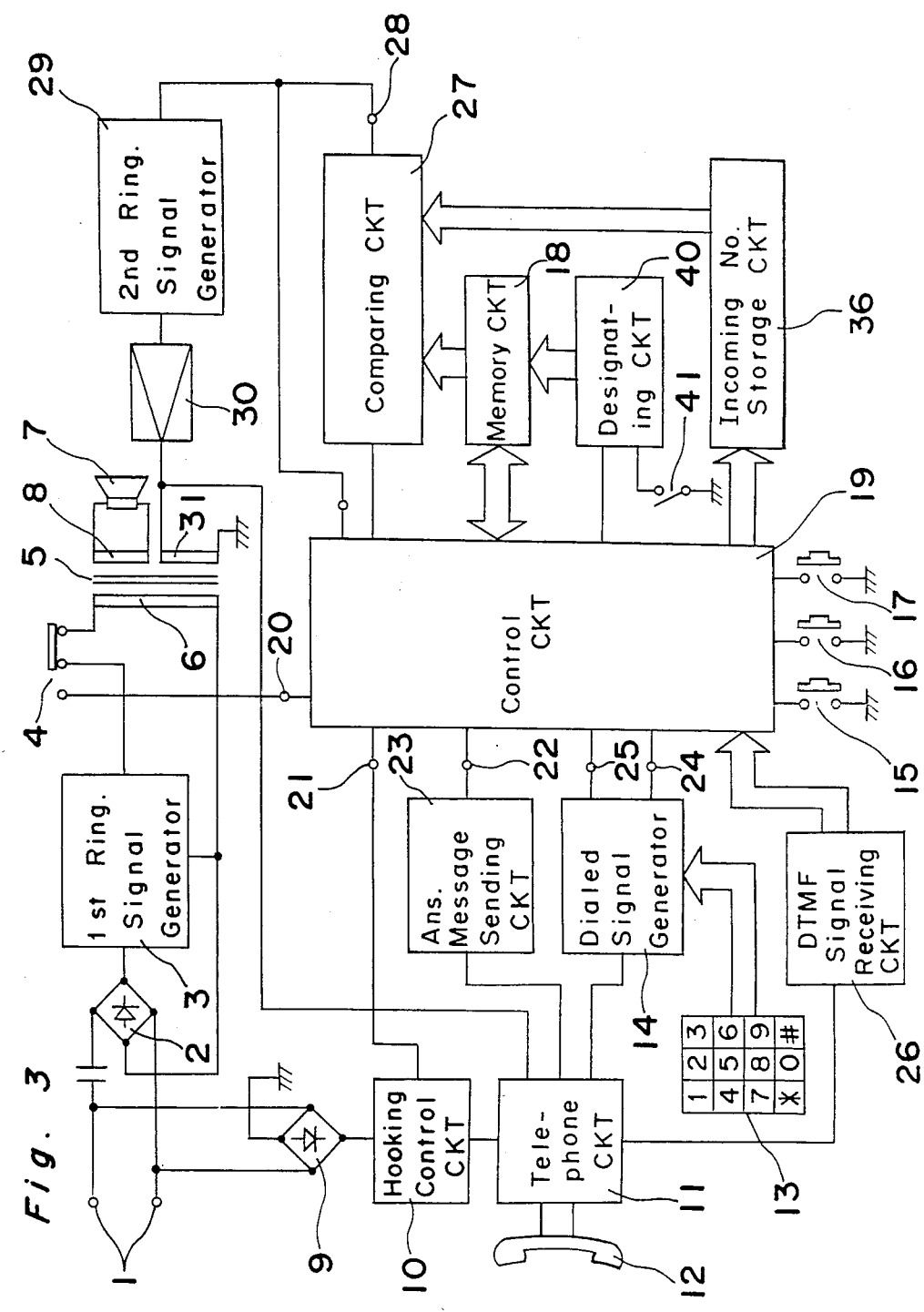

The telephone call selector according to the first preferred embodiment of FIG. 1 may further comprise, in addition to the incoming number storage circuit 36 shown in and described with reference to FIG. 2, a designating circuit 40 for designating at least one of the telephone numbers stored in the memory circuit 18 for use in comparison carried out by the comparing circuit 27 as shown in FIG. 3.

With reference to FIG. 3, the designating circuit 40 is brought into operation when and so long as a switch 41 is closed. The number designating operation carried out by the designating circuit 40 is accomplished when during the closure of the number designating switch 41 at least one of the operating switches 15 to 17 which corresponds to one of the numbers desired to be designated is closed.

While the telephone call selector according to the third preferred embodiment shown in FIG. 3 operates in a manner substantially identical with the telephone call selector according to the foregoing embodiments, the operation which differs from that of the first preferred embodiments as a result of the additional use of the designating circuit 40 will now be described for the sake of brevity. Specifically, when and so long as the switch 41 is opened, the telephone call selector shown in FIG. 3 functions in a manner substantially identical with the operation of the telephone call selector according to the first preferred embodiment, however, the telephone call selector when and so long as the switch 41 is closed functions in the following manner.

In order for one of the telephone numbers stored in the memory circuit 18 to be designated, the switch 41 should be first closed, followed by the closure of at least one of the operating switches 15 to 17 which corresponds to such one of the telephone numbers desired to be designated. By way of example, assuming that the first and second operating switches 15 and 16 are closed, the telephone number to be compared by the comparing circuit 27 is designated by the designating circuit 40 as a telephone number stored in the memory circuit 18 in correspondence with the first and second operating switches 15 and 16. Accordingly, in the event that a telephone call is made from the party whose telephone number is stored in the memory circuit 18 in correspondence with the first and second operating switches 15 and 16, the ringing operation at the end of the receiving party's telephone is carried out by the ringing signal outputted from the second ringing signal generator 29. However, where a telephone call is made from the party whose telephone number is stored in the memory circuit 18 in correspondence with the third operating switch 17, no ringing operation is performed.

It is to be noted that, in the foregoing embodiment, the number of the telephone numbers stored for the purpose of the automatic dialing function has been shown to be three, but the number thereof is not always limited thereto. In addition, in describing the foregoing embodiment of the present invention, the comparison has been described as made with the telephone numbers stored in the memory circuit 18 provided for the purpose of the dialing operation performed by manipulating single buttons. However, in a telephone device wherein any one of the telephone numbers stored in the memory circuit 18 can be read out by a special manipulation of the dialing keyboard 13, that is, an abbreviated dialing capability, the comparison may be made with the telephone numbers stored in such memory circuit. In such case, the number designation can be accomplished by operating some of the push buttons in the push button keyboard 13.

Also, instead of the use of the memory circuit in the answering message sending circuit for the storage of the answering message, a cassette tape recorder with a message-recorded cassette tape incorporated therein may be employed.

As hereinbefore described, since the telephone call selector according to the present invention is so designed that the ringing sounds can be emitted only when the number corresponding to the DTMF signal transmitted from the calling party coincides with the telephone number stored in the memory circuit, the owner of the telephone can be protected from the prank calls and the wrong numbers. In addition, since the telephone numbers stored in the memory circuit for the purpose of the automatic dialing function are utilized as respective identifier codes for the purpose of the selection of the calling party, the owner of the telephone need not inform the identifier code to those concerned and, therefore, there is no possibility that he or she may forget the identifier code.

Furthermore, since the third preferred embodiment of the present invention is such that the telephone number to be used as an identifier code can be designated from the telephone numbers stored in the memory circuit 18, the present invention is particularly advantageous and convenient particularly when applied to a telephone device having an automatic dialing function with a relatively large number of telephone numbers required to be stored.

Figure 4:
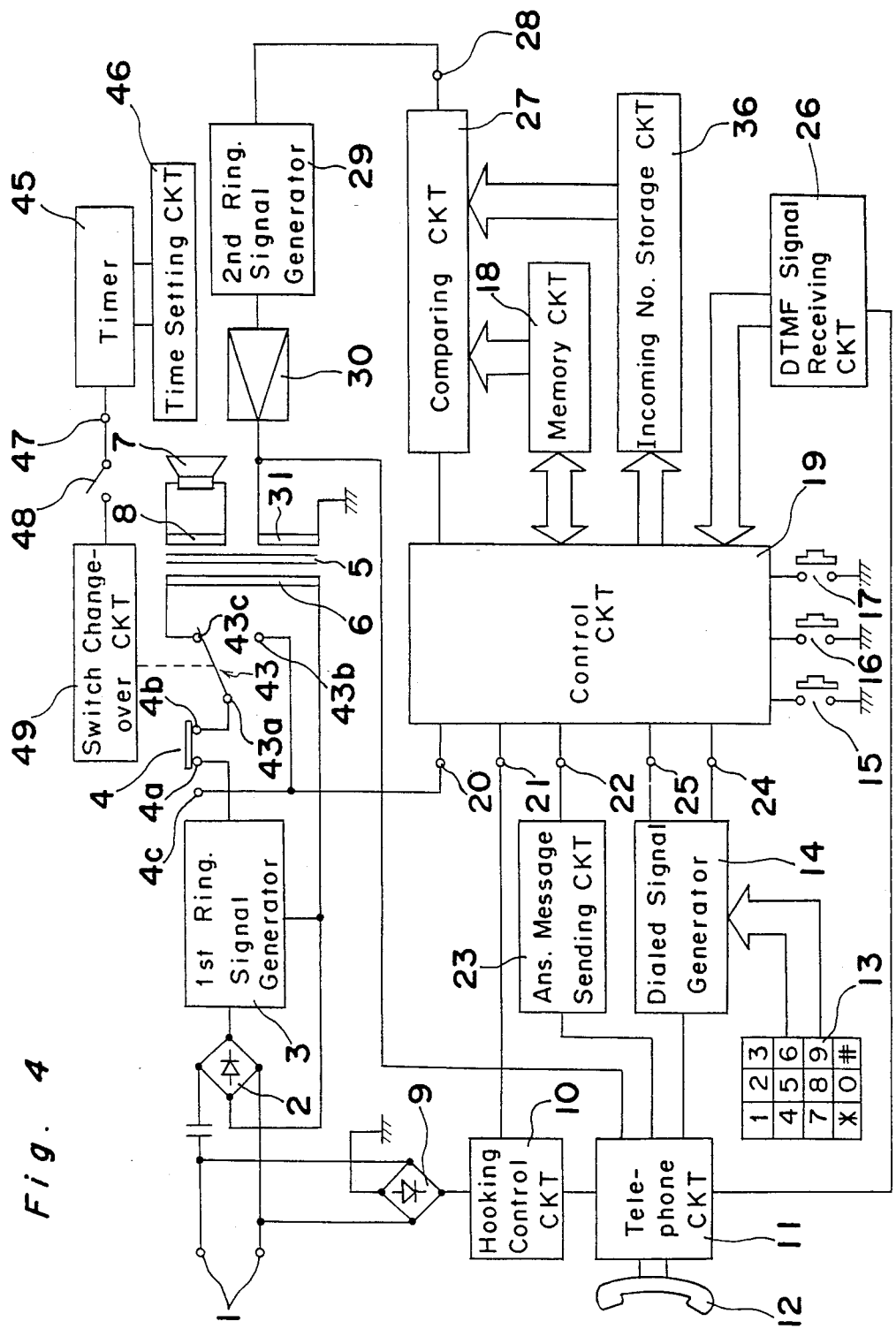

A fourth preferred embodiment of the present invention shown in FIG. 4 is substantially identical with the first preferred embodiment except for the following difference.

Referring now to FIG. 4, the selector switch 4 having a common contact 4a and first and second contact terminals 4b and 4c is connected with the primary winding 6 of the transformer 5 through a switch 43 having a common contact 43a and first and second contact terminals 43b and 43c. The common contact 4a of the selector switch 4 is adapted to receive the output signal from the first ringing signal generator 3; the first contact terminal 4b is adapted to be connected with the common contact terminal 4a when the selector switch 4 is in the inoperative position; and the second contact terminal 4c is adapted to be connected with the common contact terminal 4a when the selector switch 4 is in the operative position as shown.

Reference numeral 45 represents a timer circuit having a clock function and also having an output terminal 47 from which a high level signal can emerge during a predetermined period of time preset by a time setting circuit 46. The output terminal 47 is connected with a switch changeover circuit 49 through a control switch 48 for controlling the control operation of the timer circuit 45. The switch changeover circuit 49 is in an operative state during the closure of the control switch 48 and also during a period in which the high level signal outputted to the output terminal 47 is applied thereto. It is to be noted that the control terminal 20 of the control circuit 19 is, in this embodiment of FIG. 4, adapted to receive the output signal from the first ringing signal generator 3 through the selector switch 4 or a combination of the selector switch 4 and the switch 43.

While the telephone call selector according to the fourth preferred embodiment shown in FIG. 4 operates in a manner substantially identical with the telephone call selector according to the foregoing embodiments, the operation which differs from that of the first preferred embodiments as a result of the additional use of the timer circuit 45 and its associated circuit components will now be described.

When and so long as the selector switch 4 is set in the operative position opposite to the illustrated inoperative position with the common contact terminal 4a electrically connected with the second contact terminal 4c and disengaged from the first contact terminal 4b, the timer circuit 45 is isolated from the output of the first ringing signal generator 3 and, therefore, the control operation of the timer circuit 45 would not take place. During this condition and when the ringing signal is transmitted from the remote calling party, the ringing signal is outputted from the first ringing signal generator 3 in a similar manner as hereinbefore described. However, with the selector switch 4 set in the operative position, a signal transmitting circuit between the first ringing signal generator 3 and the primary winding 6 of the transformer 5 is disconnected and, therefore, no ringing sound is emitted from the loudspeaker 7. Instead, the ringing signal outputted from the first ringing signal generator 3 is applied to the control terminal 20 of the control circuit 19 through the selector switch 4, thereby initiating the control operation of the control circuit 19. Specifically, when the ringing signal is applied to the control terminal 20 of the control circuit 19, a signal necessary to effect a connecting operation is applied to the hooking control signal output terminal 21 of the control circuit 19, causing the hooking control circuit 10 to perform the telephone line connecting operation. Subsequent to the connecting operation, the drive signal is outputted to the drive signal output terminal 22 of the control circuit 19, which is in turn applied to the answering message sending circuit 23.

The answering message sending circuit 23 in response to the drive signal so applied thereto is brought into operation in response to the drive signal so applied thereto, with the consequence that the message stored in the message storage circuit, that is, the message reading "Yes, this is XXXXX speaking. Please give me your telephone number." for inviting the transmission of an identifier code, is outputted and is then transmitted to the calling party through the telephone circuit 11 in a manner identical with that described in connection with the first preferred embodiment.

When the calling party listening to the message so transmitted from the receiving party manipulates a dial button capable of responding to the telephone number, signal corresponding to each button, that is, the DTMF signal, is transmitted to the telephone line. The DTMF signal transmitted from the calling party is applied to the DTMF signal receiving circuit 26 through the second diode bridge circuit 9, then the hooking control circuit 10 and finally the telephone circuit 11. In response to the DTMF signal, the DTMF signal receiving circuit 26 generates to the control circuit 19 a signal which is coded version of the telephone number of the calling party. The coded signal so inputted to the control circuit 19 is stored in the incoming number storage circuit 36 built in the control circuit 19. Then, the comparison between the number stored the incoming number storage circuit 36 and the telephone number stored in the memory circuit 18 is carried out by the comparing circuit 27.

However, in the event that the number stored in the incoming number storage circuit 36 coincides with the telephone number stored in the memory circuit 18, the high level signal emerges from the output terminal 28 of the comparing circuit 27 and is in turn applied to the second ringing signal generator 29. The second ringing signal generator 29 is brought into operation in response to the high level signal with the consequence that the ringing signal different from the ringing sound generated by the first ringing signal generator 3 is outputted from the second ringing signal generator 29.

The ringing signal generated from the second ringing signal generator 29 is, after having been amplified by the amplifier 30, applied to the third winding 31 of the transformer 5. As a result thereof, the ringing signal is induced in the secondary winding 8 of the transformer 5 and subsequently applied to the loudspeaker 7 to permit the latter to emit a ringing sound. During a period in which this ringing operation is performed, the ringing signal generated from the second ringing signal generator 29 is transmitted to the calling party through the telephone circuit 11 and, therefore, the calling party can recognize that the ringing operation is being carried out at the end of the receiving party. On the other hand, when the owner of the telephone having listened to the ringing sound emitted from the loudspeaker 7 hooks off the handset 12, both of the comparing circuit 27 and the second ringing signal generator 29 are brought into inoperative conditions and the owner of the telephone can communicate with the calling party via the telephone line.

The control operation performed by the timer circuit 45 will now be described. This control operation is carried out when the control switch 48 is closed while the selector switch 4 is held in the inoperative position as shown. Since the period during which the high level signal is applied to the output terminal 47 of the timer circuit 45 is set by the time setting circuit 46 as extending from 22:00 to 6:00, the timer circuit 45 keeps generating a low level signal to the output terminal 47 during a period other than the preset period, that is, during a period from 6:00 to 22:00. Accordingly, the switch changeover circuit 49 is held inactive and the switch 43 is therefore conditioned as shown, that is, with the common contact terminal 43a engaged with the second contact terminal 43c.

In this condition, the ringing signal outputted from the first ringing signal generator 3 in the manner as hereinbefore described is applied to the primary winding 6 of the transformer 5 through the selector switch 4 and the switch 43 and is not applied to the control terminal 20 of the control circuit 19. Accordingly, the telephone device embodying the present invention can be used as the usual telephone device in the manner as hereinbefore described.

However, when it becomes ten o'clock in the evening, that is, when the preset period breaks up at 22:00, the high level signal is outputted to the output terminal 47 of the timer circuit 45, which signal is in turn applied through the control switch 48 to the switch changeover circuit 49 to activate the latter. With the switch changeover circuit 49 so activated, the common contact terminal 43a is switched over to the first contact terminal 43b to open the circuit between the selector switch 4 and the primary winding 6 of the transformer 5.

With the common contact terminal 43a engaged with the first contact terminal 43b, the ringing signal outputted from the first ringing signal generator 3 is applied to the control terminal 20 of the control circuit 19 without being applied to the primary winding 6 of the transformer 5 with the consequence that the telephone device performs the selection of the calling party in a manner as hereinbefore described. In the event that, while the common contact terminal 43a is engaged with the first contact terminal 43b, it becomes six o'clock in the morning, that is, the preset period terminates, the high level signal outputted to the output terminal 47 of the timer circuit 45 is reversed to a low level state. As a result thereof, the switch changeover circuit 49 is inactivated with the common contact terminal 43a of the switch 43 brought into engagement with the second contact terminal 43c, restoring the telephone device to the initial condition.

In this way, when the control switch is closed, the telephone device can be switched over between a normal mode, in which the telephone device can be used as the usual telephone and a call selecting mode in which the calling party is selected.

Thus, it will readily be seen that, in the event telephone call is made from a person whose telephone number does not coincide with any one of the telephone number stored in the memory circuit 18, no ringing sound is generated from the loudspeaker 7 and, therefore, any possible prank call or wrong number can be rejected.

Moreover, because of the use of the timer circuit, once the owner of the telephone presets the period of time during which the selection of the calling party is desired to be effected, the telephone can be automatically switched over between the two different modes each time the preset time comes.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention unless they depart therefrom.

We claim:

1. A telephone call selector in a telephone which comprises a memory means for storing a plurality of telephone numbers; an automatic dialing device operable to read out one of the telephone numbers from the memory means and to output a dialed signal representative of said one of the telephone numbers; means for comparing a number, corresponding to a DTMF signal transmitted from a calling party subsequent to the receipt of a ringing signal generated from a local telephone of the calling party, with any one of identifier codes; and means for emitting ringing sounds when the number corresponding to the DTMF signal coincides with such one of the identifier codes, said telephone numbers in the memory means being utilized as the respective identifier codes.

2. The telephone call selector as claimed in claim 1, further comprising means for transmitting back to the calling party a ringing signal representative of the coincidence with the number corresponding to the DTMF signal with one of the identified code.

3. The telephone call selector as claimed in claim 1, further comprising means for designating the telephone numbers to be used as the respective identifier codes.

4. The telephone call selector as claimed in claim 1 further comprising message means for transmitting an answering message back to the calling party subsequent to the coincidence of the number corresponding to the DTMF signal with the identifier code.

5. The telephone call selector as claimed in claim 1 further comprising a selector switch for bringing the telephone call selector selectively into operative and inoperative conditions; and a timer means operable to effect a selection of a calling party at a predetermined time determined by a switching operation of said timer means.

* * * * *